US012191582B2

(12) United States Patent
Tao et al.

(10) Patent No.: US 12,191,582 B2
(45) **Date of Patent: *Jan. 7, 2025**

(54) ANTENNA DEVICE

(71) Applicant: Taoglas Group Holdings Limited, Enniscorthy (IE)

(72) Inventors: Yu Tao, Taoyuan (TW); Yung Sheng Tseng, Taoyuan (TW)

(73) Assignee: Taoglas Group Holdings Limited, Enniscorthy (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,210

(22) Filed: Nov. 6, 2023

(65) Prior Publication Data

US 2024/0222867 A1 Jul. 4, 2024

Related U.S. Application Data

(63) Continuation of application No. 18/082,024, filed on Dec. 15, 2022, now Pat. No. 11,811,152, which is a continuation of application No. 17/351,601, filed on Jun. 18, 2021, now Pat. No. 11,532,886.

(30) Foreign Application Priority Data

Jun. 20, 2020 (TW) ................................ 109120981

(51) Int. Cl.
*H01Q 9/04* (2006.01)
*H01Q 1/12* (2006.01)
*H01Q 1/48* (2006.01)

(52) U.S. Cl.
CPC ............ *H01Q 9/0407* (2013.01); *H01Q 1/12* (2013.01); *H01Q 1/48* (2013.01)

(58) Field of Classification Search
CPC ........... H01Q 9/0407; H01Q 21/26–28; H01Q 1/38–48
See application file for complete search history.

(56) References Cited

U.S. PATENT DOCUMENTS

| | | | | |
|---|---|---|---|---|
| 6,342,867 | B1 | 1/2002 | Bell | |
| 10,096,908 | B2 | 10/2018 | Jan et al. | |
| 10,651,569 | B2 | 5/2020 | Watson | |
| 11,283,192 | B2 * | 3/2022 | Lea ........................ | H01Q 25/00 |

* cited by examiner

*Primary Examiner* — Hasan Islam
(74) *Attorney, Agent, or Firm* — Garson & Gutierrez, PC

(57) ABSTRACT

An antenna device comprising a first antenna, a second antenna and a circuit board. The first antenna includes a first insulating layer, a first signal-feeding line and two first grounding lines. The first signal-feeding line is disposed on a first surface of the first insulating layer. The first grounding lines are disposed on a second surface of the first insulating layer. The second antenna includes a second insulating layer, a second signal-feeding line and two second grounding lines. The second signal-feeding line is disposed on a first surface of the second insulating layer. The second grounding lines are disposed on a second surface of the second insulating layer. The first insulating layer and the second insulating layer intersect at about 90 degrees. The first and second antennas are disposed on a first surface of the circuit board. The first axis and the second axis are adjacent and substantially parallel.

20 Claims, 3 Drawing Sheets

ANTENNA DEVICE

PRIORITY

This application is a continuation of, and claims the benefit of priority to, U.S. patent application Ser. No. 18/082,024 filed Dec. 15, 2022, of the same title, which is a continuation of, and claims the benefit of priority to, U.S. patent application Ser. No. 17/351,601 filed Jun. 18, 2021, of the same title, which in turn claims the benefit of priority to Taiwanese Patent Application No. 109120981 filed on Jun. 20, 2020, of the same title, the contents of each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

1. Technological Field

The present disclosure is related to a device for receiving signals, and in particular to an antenna device.

2. Field of the Disclosure

Accompanied with the evolving communication technologies, antenna devices of many wireless communication systems continue to be miniaturized. However, in the prior art, miniaturized antenna devices may have affected performance, further leading to reliability issues.

SUMMARY

The present disclosure satisfies the foregoing needs by providing, inter alia, an antenna device with improved performance and a high reliability design.

It is one object of the present disclosure to provide an antenna device so as to improve the performance after miniaturization.

The present disclosure is to provide an antenna device comprising a first antenna, a second antenna and a circuit board. The first antenna comprises a first insulating layer, a first signal-feeding line and two first grounding lines. The first signal-feeding line is disposed on a first surface of the first insulating layer. The first grounding lines are disposed on a second surface of the first insulating layer. The first surface and the second surface of the first insulating layer are opposite to each other. The first grounding lines are symmetrical with a first axis on the first insulating layer. The second antenna comprises a second insulating layer, a second signal-feeding line and two second grounding lines. The second signal-feeding line is disposed on a first surface of the second insulating layer. The second grounding lines are disposed on a second surface of the second insulating layer. The first surface and the second surface of the second insulating layer are opposite to each other. The second grounding lines are symmetrical with a second axis on the second insulating layer. The first insulating layer and the second insulating layer intersect at about 90 degrees. The first antenna and the second antenna are disposed on a first surface of the circuit board. The first axis and the second axis are adjacent and substantially parallel.

In an embodiment of the present disclosure, the first axis and the second axis substantially coincide.

In an embodiment of the present disclosure, the first signal-feeding line comprises a first end and a second end, each of the first grounding lines comprises a first end and a second end, the first end of the first signal-feeding line is adapted to completing wireless signal reception matching with the first end of each of the first grounding lines in a first frequency band, and the second end of the first signal-feeding line is adapted to completing wireless signal reception matching with the second end of each of the first grounding lines in a second frequency band.

In an embodiment of the present disclosure, the first insulating layer has a side surface being away from the circuit board and connecting the first surface and the second surface of the first insulating layer, the first end of the first signal-feeding line is adjacent to the side surface of the first insulating layer, the second end of the first signal-feeding line is adjacent to the side surface of the first insulating layer, and the second end of the first signal-feeding line is more adjacent to the side surface of the first insulating layer than the first end of the first signal-feeding line.

In an embodiment of the present disclosure, a distance between the first end of the first signal-feeding line and the side surface of the first insulating layer is smaller than ⅓ of a distance between the side surface of the first insulating layer and the circuit board, and a distance between the second end of the first signal-feeding line and the side surface of the first insulating layer is smaller than ⅓ of the distance between the side surface of the first insulating layer and the circuit board.

In an embodiment of the present disclosure, the second signal-feeding line comprised a first end and a second end, each of the second grounding lines comprises a first end and a second end, the first end of the second signal-feeding line is adapted to completing wireless signal reception matching with the first end of each of the second grounding lines in the first frequency band, and the second end of the second signal-feeding line is adapted to completing wireless signal reception matching with the second end of each of the second grounding lines in the second frequency band.

In an embodiment of the present disclosure, the second insulating layer has a side surface being away from the circuit board and connecting the first surface and the second surface of the second insulating layer, the first end of the second signal-feeding line is adjacent to the side surface of the second insulating layer, the second end of the second signal-feeding line is adjacent to the side surface of the second insulating layer, and the second end of the second signal-feeding line is more adjacent to the side surface of the second insulating layer than the first end of the second signal-feeding line.

In an embodiment of the present disclosure, a distance between the first end of the second signal-feeding line and the side surface of the second insulating layer is smaller than ⅓ of a distance between the side surface of the second insulating layer and the circuit board, and a distance between the second end of the second signal-feeding line and the side surface of the second insulating layer is smaller than ⅓ of the distance between the side surface of the second insulating layer and the circuit board.

In an embodiment of the present disclosure, a shortest distance between the first grounding lines is between 0 and 10 mm.

In an embodiment of the present disclosure, a shortest distance between the second grounding lines is between 0 and 10 mm.

In an embodiment of the present disclosure, the first axis and the second axis are substantially perpendicular to the first surface of the circuit board.

In an embodiment of the present disclosure, the antenna device further comprises a reflecting board, disposed on a second surface of the circuit board. The first surface and the second surface of the circuit board are opposite to each other.

In an embodiment of the present disclosure, a shape and a location of the first signal-feeding line on the first insulating layer are respectively similar to a shape and a location of the second signal-feeding line on the second insulating layer, and a shape and a location of the first grounding lines on the first insulating layer are respectively similar to a shape and a location of the second grounding lines on the second insulating layer.

Other features and advantages of the present disclosure will immediately be recognized by persons of ordinary skill in the art with reference to the attached drawings and detailed description of exemplary implementations as given below.

BRIEF DESCRIPTION OF THE DRAWINGS

The features, objectives, and advantages of the present disclosure will become more apparent from the detailed description set forth below when taken in conjunction with the drawings, wherein.

All Figures disclosed herein are @ Copyright 2020-2021 Taoglas Group Holdings Limited. All rights reserved.

EXEMPLARY EMBODIMENTS

Detailed descriptions of the various embodiments and variants of the apparatus of the present disclosure are now provided. It is noted that wherever practicable similar or like reference numbers may be used in the figures and may indicate similar or like functionality. The figures depict embodiments of the disclosed system for purposes of illustration only. One skilled in the art will readily recognize from the following description that alternative embodiments of the structures illustrated herein may be employed without necessarily departing from the principles described herein.

Figure 1:
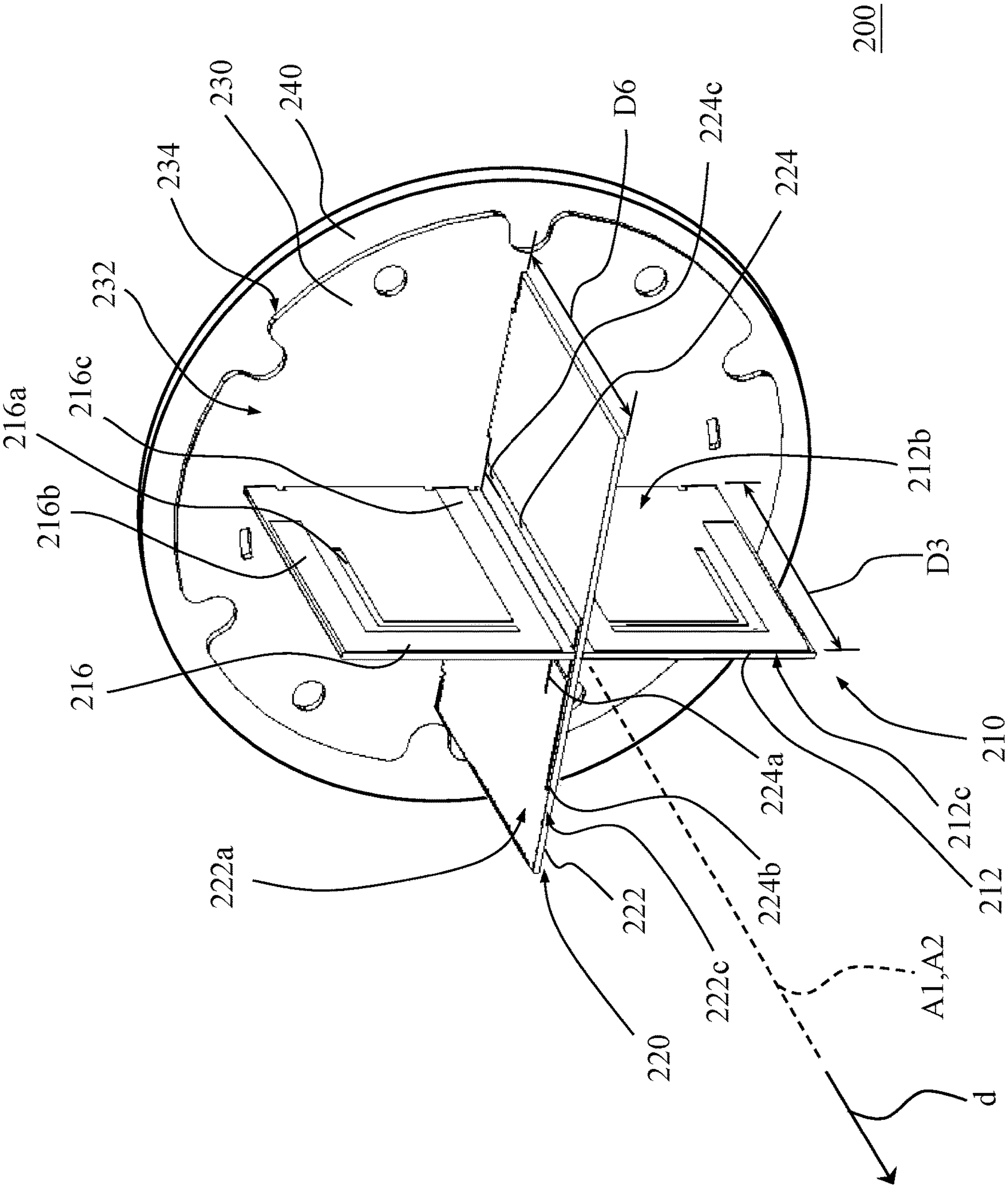
FIG. 1 is a perspective view of an antenna device having a first and second antenna, in accordance with the principles of the present disclosure.
Figure 2B:
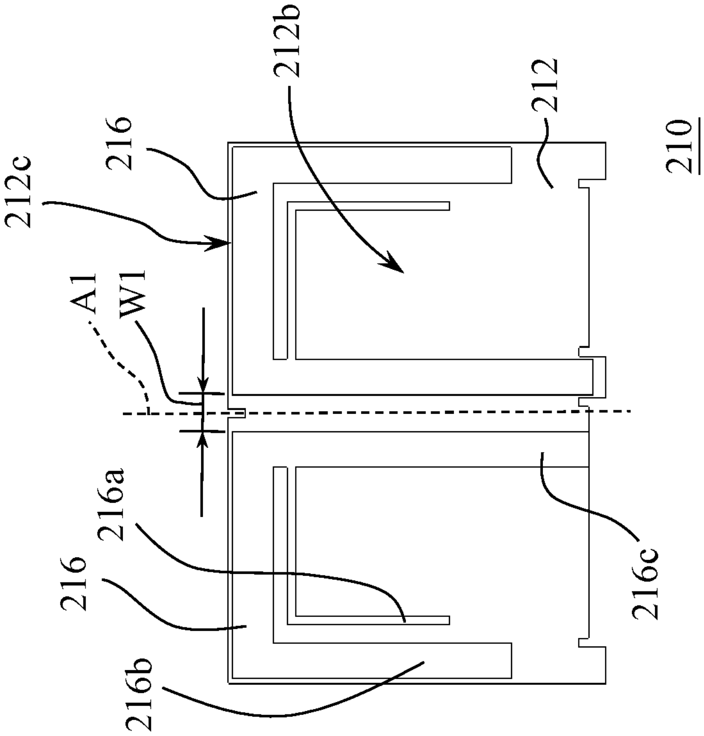
FIG. 2B shows a rear plan view of the first antenna of FIG. 1, in accordance with the principles of the present disclosure.
Figure 2A:
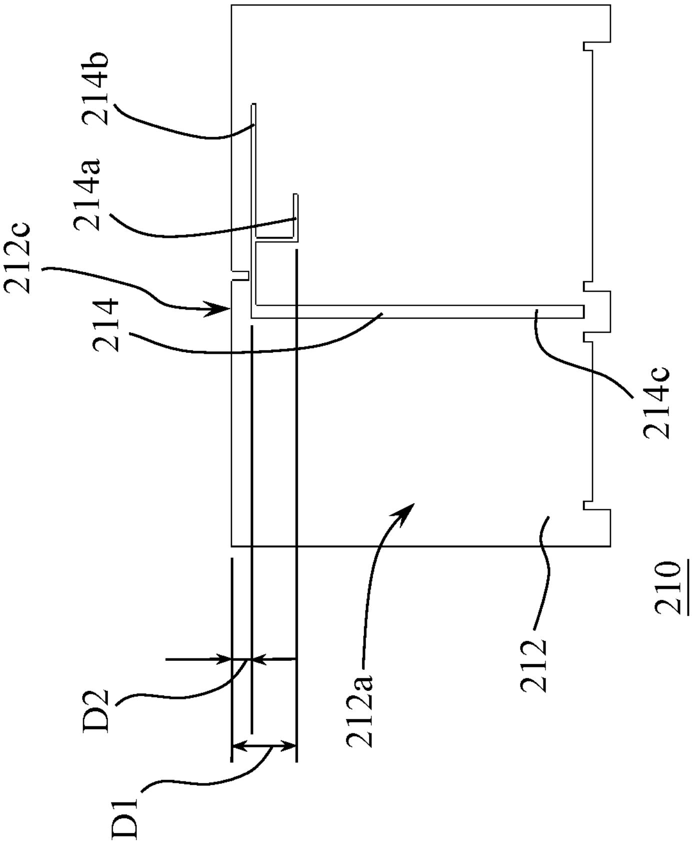
FIG. 2A shows a front plan view of the first antenna of FIG. 1, in accordance with the principles of the present disclosure.
Figure 3B:
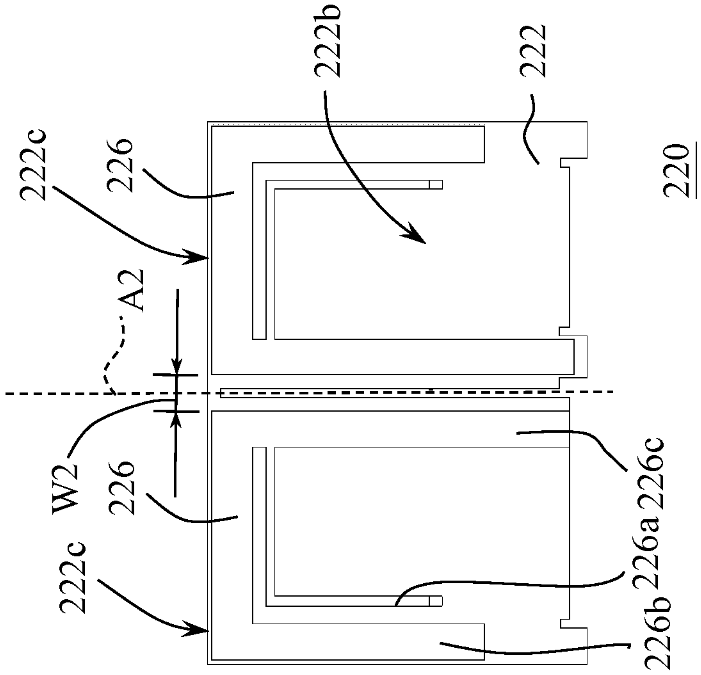
FIG. 3B shows a rear plan view of the second antenna of FIG. 1, in accordance with the principles of the present disclosure.
Figure 3A:
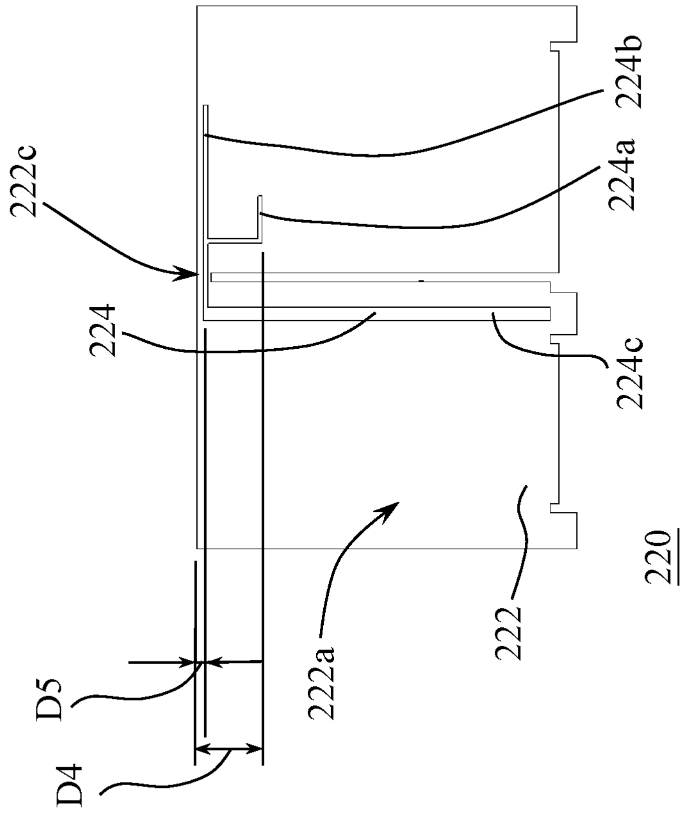
FIG. 3A shows a front plan view of the second antenna of FIG. 1, in accordance with the principles of the present disclosure.

FIG. 1 shows a three-dimensional schematic diagram of an antenna device 200 according to an embodiment of the present disclosure. FIG. 2A shows a front schematic diagram of the first antenna 210 in FIG. 1. FIG. 2B shows a rear schematic diagram of the first antenna 210 in FIG. 1. FIG. 3A shows a front schematic diagram of the second antenna 220 in FIG. 1. FIG. 3B shows a rear schematic diagram of a second antenna 220 in FIG. 1. Referring to FIG. 1, FIG. 2A, FIG. 2B, FIG. 3A and FIG. 3B, an antenna device 200 of the embodiment includes a first antenna 210, a second antenna 220, a circuit board 230 and a reflecting board 240. The first antenna 210 and the second antenna 220 are arranged on a first surface 232 of the circuit board 230, and the reflecting board 240 is arranged on a second surface 234 of the circuit board 230. The first surface 232 of the circuit board 230 and the second surface 234 of the circuit board 230 are opposite to each other.

The first antenna 210 may include a first insulating layer 212, a first signal-feeding line 214 and two first grounding lines 216. The first signal-feeding line 214 is arranged on a first surface 212*a* of the first insulating layer 212. The two first grounding lines 216 are arranged on a second surface 212*b* of the first insulating layer 212. The first surface 212*a* and the second surface 212*b* of the first insulating layer 212 are opposite to each other, and the first grounding lines 216 are symmetrical about a first axis A1 on the first insulating layer 212. From FIG. 2B, it is known that the first axis A1 is substantially parallel to the second surface 212*b* of the first insulating layer 212. Further, in some implementations, a shortest distance W1 between the two first grounding lines 216 is between 0 and 10 mm.

In some implementations, the first signal-feeding line 214 includes a first end 214*a*, a second end 214*b* and a third end 214*c*, and each of the first grounding lines includes a first end 216*a*, a second end 216*b* and a third end 216*c*. The first end 214*a* of the first signal-feeding line 214 is adapted to match the first end 216*a* of each first grounding line 216 in respect of receiving wireless signals in a first frequency band (with details to be described below), and the second end 214*b* of the first signal-feeding line 214 is adapted to match the second end 216*b* of each first grounding line 216 in respect of receiving wireless signals in a second frequency band (with details to be described below). The third end 214*c* of the first signal-feeding line 214 is electrically connected to a signal line (not shown) of the circuit board 230 and the third end 216*c* of the first grounding line 216 is electrically connected to a grounding line (not shown) of the circuit board 230. In some implementations, one of the first end 214*a* and the second end 214*b* of the first signal-feeding line 214 may be omitted, and one of the first end 216*a* and the second end 216*b* of the first grounding line 216 may be omitted, depending on designer requirements. In other implementations, additional ends of the first signal-feeding line 214 may be added, and additional ends of the first grounding line 216 may be added, dependent upon designer requirements.

In some implementations, the first insulating layer 212 may have a side surface 212*c*, which is away from the circuit board 230 and connects the first surface 212*a* and the second surface 212*b* of the first insulating layer 212. The first end 214*a* of the first signal-feeding line 214 may also be near the side surface 212*c* of the first insulating layer 212, and the second end 214*b* of the first signal-feeding line 214 may also be near the side surface 212*c* of the first insulating layer 212. The second end 214*b* of the first signal-feeding line 214 is closer to the side surface 212*c* of the first insulating layer 212 than the first end 214*a* of the first signal-feeding line 214. Moreover, a distance D1 between the first end 214*a* of the first signal-feeding line 214 and the side surface 212*c* of the first insulating layer 212 may be less than a ⅓ of a distance D3 between the side surface 212*c* of the first insulating layer 212 and the circuit board 230, and a distance D2 between the second end 214*b* of the first signal-feeding line 214 and the side surface 212*c* of the first insulating layer 212 may also be less than a ⅓ of the distance D3 between the side surface 212*c* of the first insulating layer 212 and the circuit board 230.

The second antenna 220 includes a second insulating layer 222, a second signal-feeding line 224 and two second grounding lines 226. The second signal-feeding line 224 is arranged on a first surface 222*a* of the second insulating layer 222. The two grounding lines 226 are arranged on a second surface 222*b* of the second insulating layer 222. The first surface 222*a* and the second surface 222*b* of the second insulating layer 222 are opposite to each other, and the second grounding lines 226 are symmetrical about a second axis A2 on the second insulating layer 222. From FIG. 3B, it is known that the second axis A2 is substantially parallel to the second surface 222*b* of the second insulating layer 222. Moreover, in some implementations, a shortest distance W2 between the second grounding lines 226 is between 0 and 10 mm.

In some implementations, the second signal-feeding line 224 includes a first end 224*a*, a second end 224*b* and a third end 224*c*, and each of the second grounding lines includes a first end 226*a*, a second end 226*b* and a third end 226*c*. The first end 224*a* of the second signal-feeding line 224 is adapted to match the first end 226*a* of each second grounding line 226 in respect of receiving wireless signals in the first frequency band (with details to be described below), and the second end 224*b* of the second signal-feeding line 224 is adapted to match the second end 226*b* of each second grounding line 226 in respect of receiving wireless signals in the second frequency band (with details to be described below). The third end 224*c* of the second signal-feeding line 224 is electrically connected to a signal line (not shown) of the circuit board 230, and the third end 226*c* of the second grounding line 226 is electrically connected to a grounding line (not shown) of the circuit board 230. In some implementations, one of the first end 224*a* and the second end 224*b* of the second signal-feeding line 224 may be omitted, and one of the first end 226*a* and the second end 226*b* of the second grounding line may also be omitted, depending on designer requirements. In other implementations, additional ends of the second signal-feeding line 224 may be added, and additional ends of the second grounding line 226 may be added, dependent upon designer requirements.

In some implementations, the second insulating layer 222 may have a side surface 222*c*, which is away from the circuit board 230 and connects the first surface 222*a* and the second surface 222*b* of the second insulating layer 222. The first end 224*a* of the second signal-feeding line 224 may be close to the side surface 222*c* of the second insulating layer 222, and the second end 224*b* of the second signal-feeding line 224 may also be close to the side surface 222*c* of the second insulating layer 222. The second end 224*b* of the second signal-feeding line 224 is closer to the side surface 222*c* of the second insulating layer 222 than the first end 224*a* of the second signal-feeding line 224. Moreover, a distance D4 between the first end 224*a* of the second signal-feeding line 224 and the side surface 222*c* of the second insulating layer 222 may be less than ⅓ of a distance D6 between the side surface 222*c* of the second insulating layer 222 and the circuit board 230, and a distance D5 between the second end 224*b* of the second signal-feeding line 224 and the side surface 222*c* of the second insulating layer 222 may be less than ⅓ of the distance D6 between the side surface 222*c* of the second insulating layer 222 and the circuit board 230.

It should be noted that, the first insulating layer 212 and the second insulating layer 222 of the antenna device 200 may intersect at approximately 90 degrees, and the first axis A1 and the second axis A2 may be adjacent and substantially parallel. In some implementations, the first axis A1 and the second axis A2 are as close as possible and substantially coincident. Further, the first axis A1 and the second axis A2 may be substantially perpendicular to the first surface 232 of the circuit board 230. Moreover, in some implementations, designs of the first antenna 210 and the second antenna 220 may be similar to one another. That is, the shape of the first signal-feeding line 214 and the position thereof on the first insulating layer 212 are respectively similar to the shape of the second signal-feeding line 224 and the position thereof on the second insulating layer 222, and the shape of the first grounding lines 216 and the position thereof on the first insulating layer 212 are respectively similar to the shape of the second grounding lines 226 and the position thereof on the second insulating layer 222. In other implementations, the shapes of the first signal-feeding line 214 and/or the positioning thereof on the first insulating layer 212 may differ somewhat from the shape of the second signal-feeding line 224 and the position thereof on the second insulating layer, and the shape of the first grounding lines 216 and the position thereof on the first insulating layer 212 may differ somewhat from the shape of the second grounding lines 226 and the position thereof on the second insulating layer 222.

When the antenna device 200 receives a wireless signal (for example but not limited to, a Global Positioning System (GPS) wireless signal), the two symmetrically arranged first grounding lines 216 of the first antenna 210 produce resonance with the external GPS signal. The width of the first end 216*a* of each first grounding line 216 is narrower and is adapted to produce resonance with GPS signals in a higher frequency band (e.g., a signal of the L1 frequency band (near 1575.42 MHZ)), and the width of the second end 216*b* of each first grounding line 216 is wider and adapted to produce resonance with GPS signals in a lower frequency band (e.g., a signal of the L2, L5 or L6 frequency band (respectively near 1227.60 MHz, 1176.45 MHz and 1278.8 MHz).

At this point, the first end 214*a* of the first signal-feeding line 214 of the first antenna 210 may match with the first end 216*a* of each first grounding line 216 in respect of receiving a linearly polarized signal in a higher frequency band, further capturing the signal and feeding the signal through the third end 214*c* to the signal line on the circuit board 230. Alternatively, the second end 214*b* of the first signal-feeding line 214 of the first antenna 210 may match with the second end 216*b* of each first grounding line 216 in respect of receiving a linearly polarized signal in a lower frequency band, further capturing the signal and feeding the signal through the third end 214*c* to the signal line on the circuit board 230. Similarly, the operation of the second antenna 220 may be referred to the above operation of the first antenna 210, and therefore, is omitted herein. In addition, the reflecting board 240 such as a metal plate may enhance the signal gains of the first signal-feeding line 214 and the second signal-feeding line 224 when the antenna device 200 receives wireless signals.

Next, a combiner (not shown) on the circuit board 230 may combine the linearly polarized signal in a higher frequency band fed in by the first signal-feeding line 214 of the first antenna 210 and the linearly polarized signal in a higher frequency band fed in by the second signal-feeding line 224 of the second antenna 220 into a right-hand circularly polarized signal in a higher frequency band. Alternatively, a combiner on the circuit board 230 may combine the linearly polarized signal in a lower frequency band fed in by the first signal-feeding line 214 of the first antenna 210 and the linearly polarized signal in a lower frequency band fed in by the second signal-feeding line 224 of the second antenna 220 into a right-hand circularly polarized signal in a lower frequency band.

On the basis of the above description, because the two first grounding lines 216 of the first antenna 210 are in a symmetrical arrangement, the current distribution on the two symmetrically arranged first grounding lines 216 of the first antenna 210 is symmetrical when the antenna device 200 receives signals. Thus, the shape of the radiation field of the signals captured by the first signal-feeding line 214 of the first antenna 210 similarly faces upward (i.e., in a direction d in FIG. 1). Likewise, the shape of the radiation field of the signals captured by the second signal-feeding line 224 of the second antenna 220 also similarly faces upward. In addition, designs of the first antenna 210 and the second antenna 220 are similar (that is, the shape of the first signal-feeding line 214 and the position thereof on the first insulating layer 212 are respectively similar to the shape of the second signal-feeding line 224 and the position thereof on the second insulating layer 222, and the shape of the first grounding lines 216 and the position thereof on the first insulation layer 212 are respectively similar to the shape of the second grounding lines 226 and the position thereof on the second insulating layer 222). Therefore, the gain of the signals captured by the first signal-feeding line 214 from the two symmetrically arranged first grounding lines 216 is similar to the gain of the signals captured by the second signal-feeding line 224 from the two symmetrically arranged second grounding lines 226. On the basis of the above description, the signals respectively captured by the first antenna 210 and the second antenna 220 that intersect at approximately 90 degrees may have similar intensity in the direction d. Accordingly, the axis ratio (AR) of the right-hand circularly polarized signal combined by the circuit board 230 may be controlled to be less than 2.

It is known from the above that, compared to the prior art, the antenna device 200 of the embodiment of the present disclosure has better performance in terms of signal reception.

It will be recognized that while certain aspects of the present disclosure are described in terms of specific design examples, these descriptions are only illustrative of the broader methods of the disclosure and may be modified as required by the particular design. Certain features may be rendered unnecessary or optional under certain circumstances. Additionally, certain features or functionality may be added to the disclosed embodiments. All such variations are considered to be encompassed within the present disclosure described and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

What is claimed is:

1. An antenna device, comprising:

a first antenna, comprising:

a first insulating layer;

a first signal-feeding line, the first signal-feeding line disposed on a first surface of the first insulating layer; and two first grounding lines, the two first grounding lines disposed on a second surface of the first insulating layer, wherein the first surface and the second surface of the first insulating layer are parallel with one another;

a second antenna, comprising:

a second insulating layer;

a second signal-feeding line, the second signal-feeding line disposed on a first surface of the second insulating layer; and two second grounding lines, the two second grounding lines disposed on a second surface of the second insulating layer, wherein the first surface and the second surface of the second insulating layer are parallel with one another; and a circuit board;

wherein the first insulating layer and the second insulating layer are arranged orthogonal to one another, the first antenna and the second antenna are disposed on a first surface of the circuit board, and the first axis and the second axis are parallel with one another;

wherein the first insulating layer, the second insulating layer and the circuit board are each arranged orthogonal to one another.

2. The antenna device according to claim 1, wherein each of the two first grounding lines are symmetrical with one another with respect to a first axis of the first insulating layer.

3. The antenna device according to claim 2, wherein each of the two second grounding lines are symmetrical with one another with respect to a second axis of the second insulating layer.

4. The antenna device according to claim 1, wherein the first signal-feeding line comprises a first end and a second end, each of the two first grounding lines comprises a first end and a second end, the first end of the first signal-feeding line is for wireless signal reception matching with the first end of each of the two first grounding lines in a first frequency band, and the second end of the first signal-feeding line is for wireless signal reception matching with the second end of each of the two first grounding lines in a second frequency band.

5. The antenna device according to claim 4, wherein the first insulating layer has a side surface that is disposed furthest away from the circuit board as compared with other surfaces of the first insulating layer, the side surface connects the first surface and the second surface of the first insulating layer, the first end of the first signal-feeding line is adjacent to the side surface of the first insulating layer, the second end of the first signal-feeding line is adjacent to the side surface of the first insulating layer, and the second end of the first signal-feeding line is more adjacent to the side surface of the first insulating layer than the first end of the first signal-feeding line.

6. The antenna device according to claim 5, wherein a distance between the first end of the first signal-feeding line and the side surface of the first insulating layer is smaller than a ⅓ of a distance between the side surface of the first insulating layer and the circuit board, and a distance between the second end of the first signal-feeding line and the side surface of the first insulating layer is smaller than a ⅓ of the distance between the side surface of the first insulating layer and the circuit board.

7. The antenna device according to claim 1, wherein the second signal-feeding line comprises a first end and a second end, each of the two second grounding lines comprises a first end and a second end, the first end of the second signal-feeding line is for wireless signal reception matching with the first end of each of the two second grounding lines in the first frequency band, and the second end of the second signal-feeding line is for wireless signal reception matching with the second end of each of the two second grounding lines in the second frequency band.

8. The antenna device according to claim 7, wherein the second insulating layer has a side surface that is disposed furthest away from the circuit board as compared with other surfaces of the second insulating layer, the side surface of the second insulating layer connects the first surface and the second surface of the second insulating layer, the first end of the second signal-feeding line is adjacent to the side surface of the second insulating layer, the second end of the second signal-feeding line is adjacent to the side surface of the second insulating layer, and the second end of the second signal-feeding line is more adjacent to the side surface of the second insulating layer than the first end of the second signal-feeding line.

9. The antenna device according to claim 8, wherein a distance between the first end of the second signal-feeding line and the side surface of the second insulating layer is smaller than a ⅓ of a distance between the side surface of the second insulating layer and the circuit board, and a distance between the second end of the second signal-feeding line and the side surface of the second insulating layer is smaller than a ⅓ of the distance between the side surface of the second insulating layer and the circuit board.

10. The antenna device according to claim 3, wherein the first axis and the second axis are substantially perpendicular to the first surface of the circuit board.

11. The antenna device according to claim 10, further comprising a reflecting board that is disposed on a second surface of the circuit board, wherein the first surface and the second surface of the circuit board are parallel with each other and oppose one another.

12. The antenna device according to claim 11, wherein a shortest distance between each of the two first grounding lines is between 0 and 10 mm; and wherein a shortest distance between each of the two second grounding lines is between 0 and 10 mm.

13. The antenna device according to claim 1, wherein a shape and a location of the first signal-feeding line on the first insulating layer are respectively similar to a shape and a location of the second signal-feeding line on the second insulating layer, and a shape and a location of the two first grounding lines on the first insulating layer are respectively similar to a shape and a location of the two second grounding lines on the second insulating layer.

14. The antenna device of claim 1, wherein the first signal feeding line comprises:

a second segment that is disposed orthogonal with a third segment of the first signal feeding line; and a first segment of the first signal feeding line branches off of the second segment, the first segment of the first signal feeding line comprises an L-shaped segment, a first segment of the L-shaped segment being disposed parallel with the third segment of the first signal feeding line and a second segment of the L-shaped segment being disposed parallel with the second segment of the first signal feeding line.

15. The antenna device of claim 14, wherein the second signal feeding line comprises:

a second segment that is disposed orthogonal with a third segment of the second signal feeding line; and a first segment of the second signal feeding line branches off of the second segment, the first segment of the second signal feeding line comprises an L-shaped segment, a first segment of the L-shaped segment being disposed parallel with the third segment of the second signal feeding line and a second segment of the L-shaped segment being disposed parallel with the second segment of the second signal feeding line.

16. The antenna device of claim 15, wherein each of the two first grounding lines comprises:

a first segment that runs from an end adjacent the circuit board towards an opposing side surface of the first insulating layer;

a second segment that is connected with the first segment that runs orthogonal from the first segment;

a third segment that is connected with the second segment that runs generally parallel with the first segment; and an L-shaped segment that is connected with the first segment, the L-shaped segment having a first portion that runs parallel with the second segment and a second portion that runs parallel with the third segment.

17. The antenna device of claim 16, wherein the L-shaped segment of each of the two first grounding lines comprises a width that is less than a width of each of the first, second and third segments of each of the two first grounding lines.

18. The antenna device of claim 17, wherein each of the two second grounding lines comprises:

a first segment that runs from an end adjacent the circuit board towards an opposing side surface of the second insulating layer;

a second segment that is connected with the first segment that runs orthogonal from the first segment;

a third segment that is connected with the second segment that runs generally parallel with the first segment; and an L-shaped segment that is connected with the first segment, the L-shaped segment having a first portion that runs parallel with the second segment and a second portion that runs parallel with the third segment.

19. The antenna device of claim 18, wherein the L-shaped segment of each of the two second grounding lines comprises a width that is less than a width of each of the first, second and third segments of each of the two second grounding lines.

20. The antenna device of claim 19, wherein the second insulating layer comprises a slot that is symmetrical about the second axis of the second insulating layer, the first insulating layer being disposed within the slot of the second insulating layer.

* * * * *